Patented Oct. 11, 1938

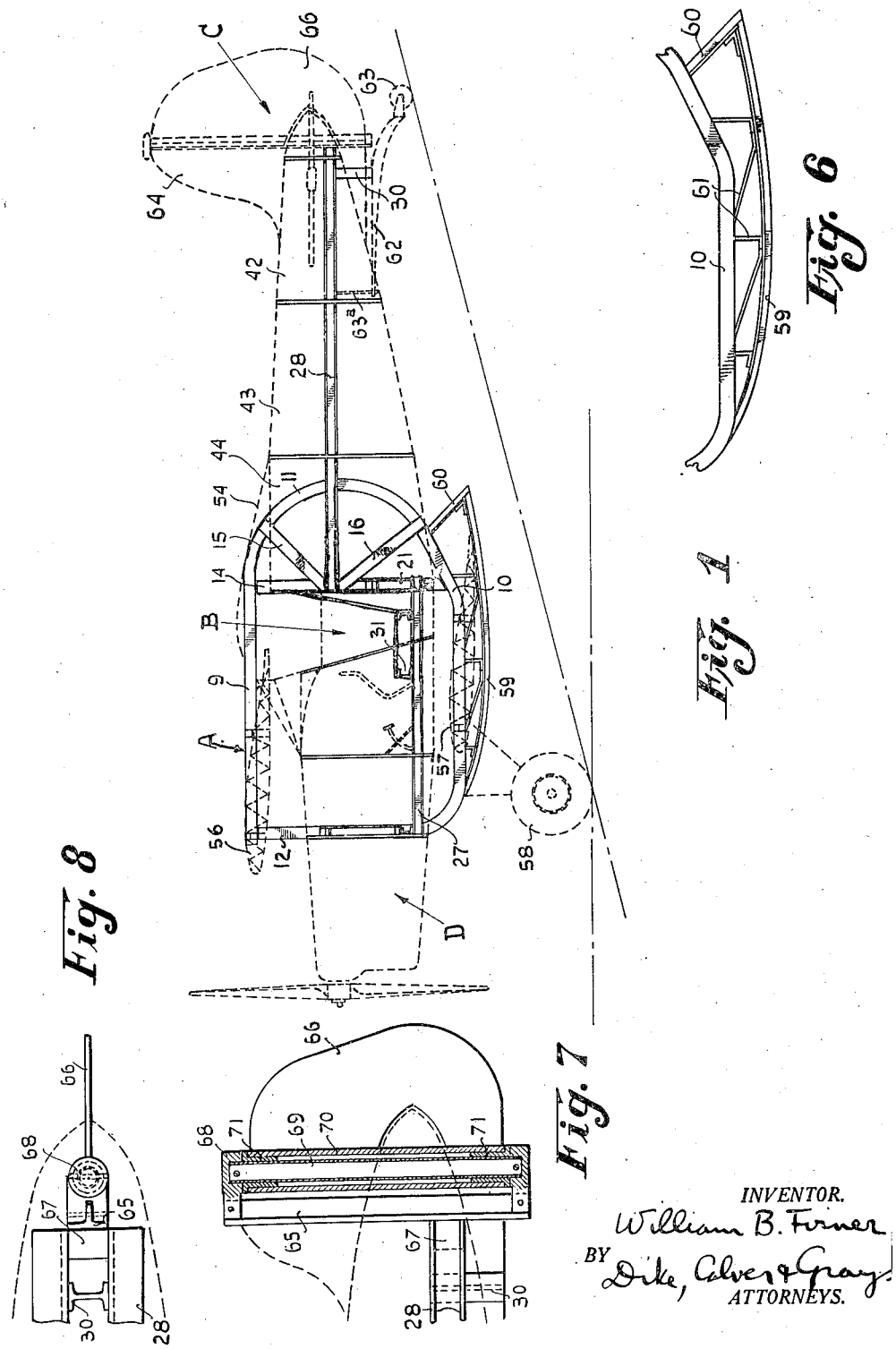

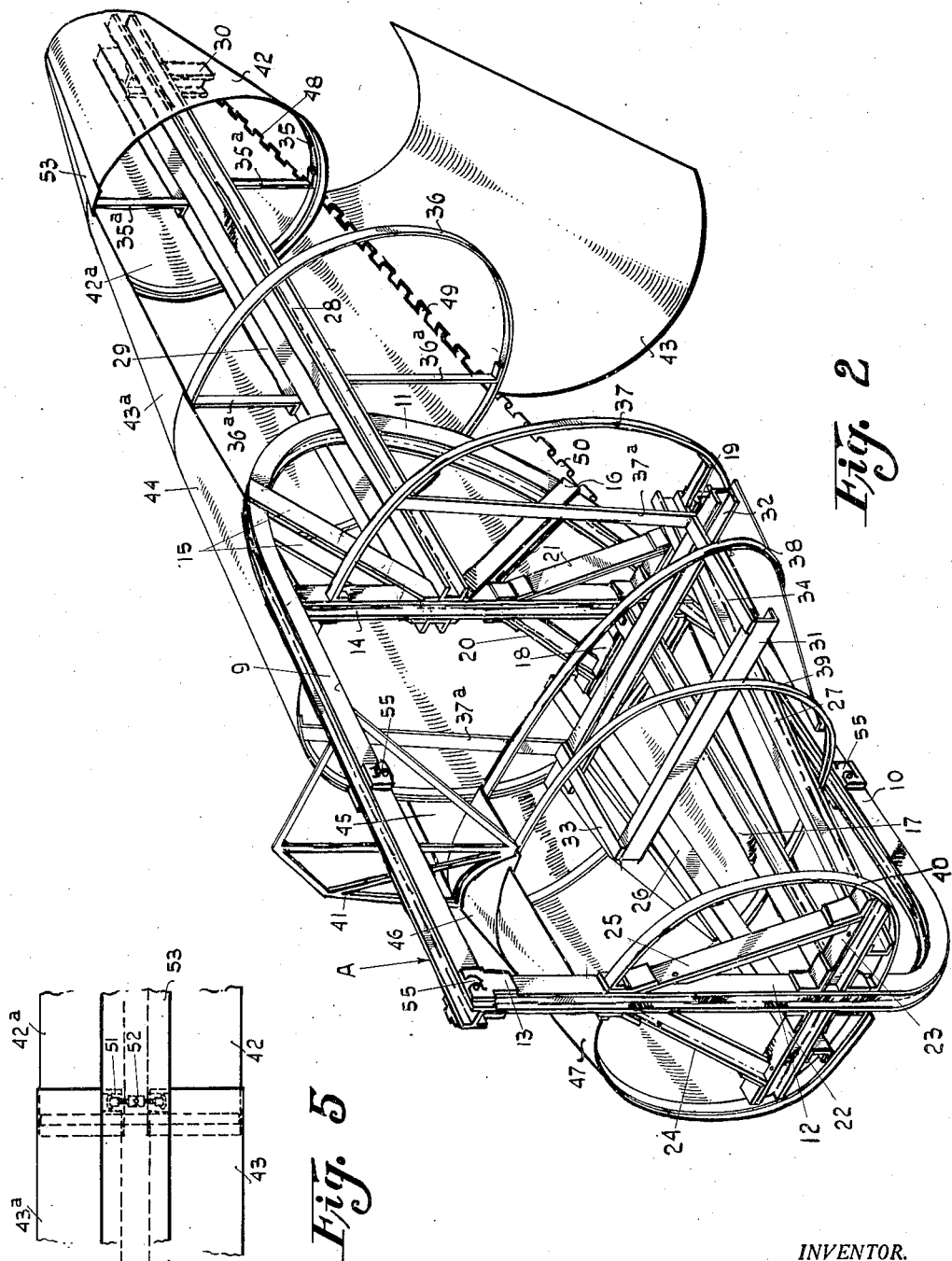

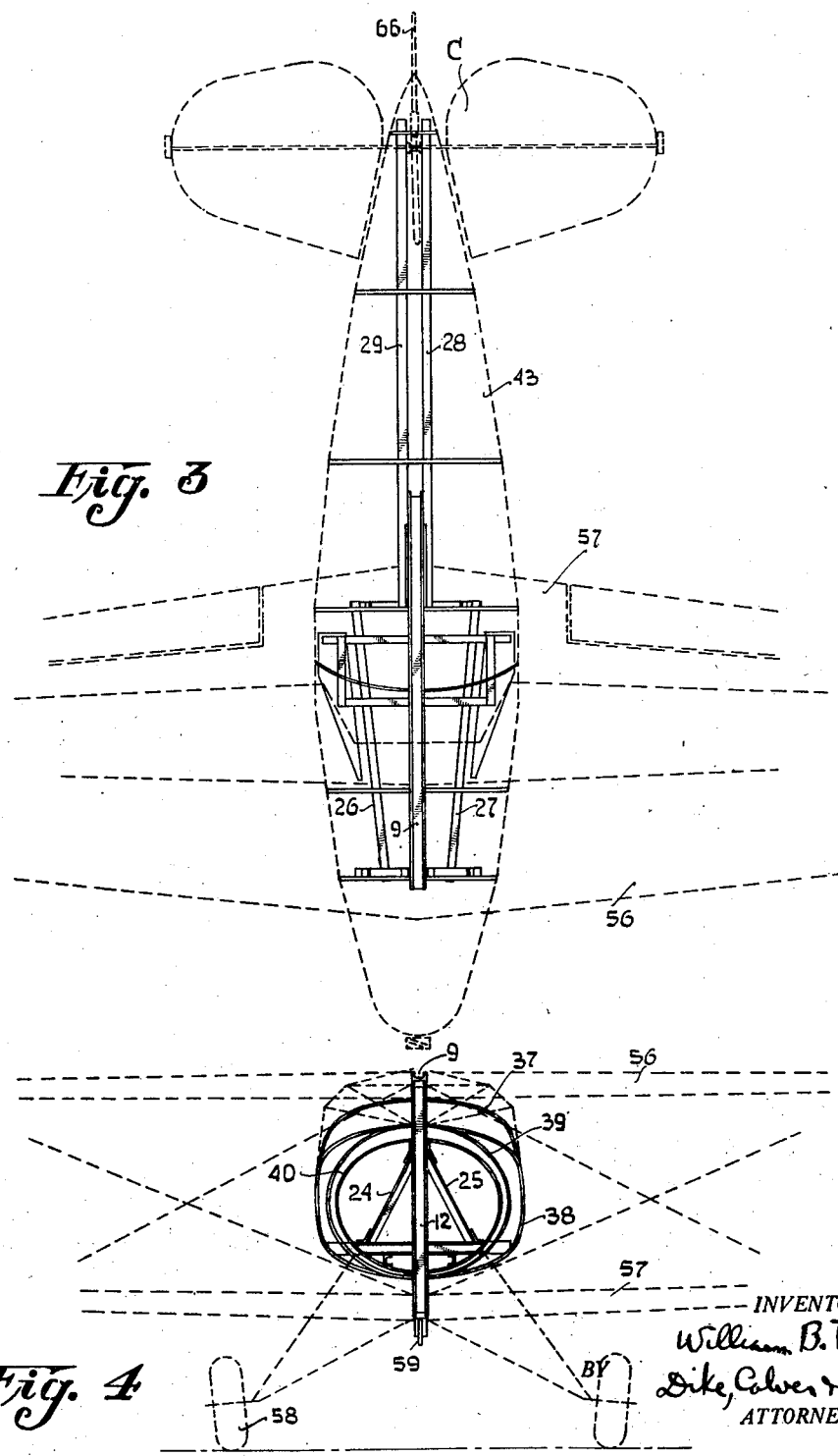

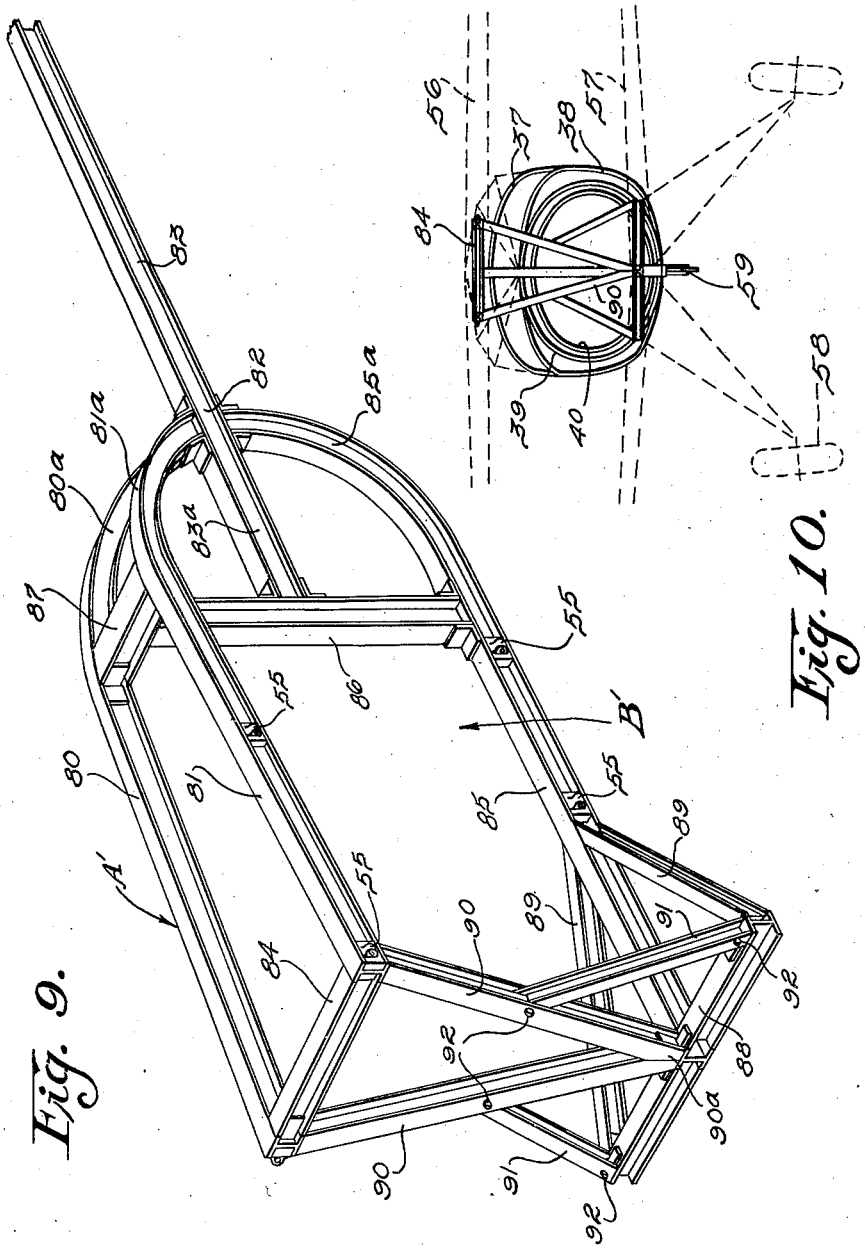

2,132,529

UNITED STATES PATENT OFFICE 2,132,529

AIRPLANE CONSTRUCTION

William B. Firner, Detroit, Mich.

Continuation of application Serial No. 561,219, September 4, 1931. This application September 17, 1935, Serial No. 40,991. Renewed October 19, 1936

19 Claims. (Cl. 244—119)

This invention relates to aircraft and more particularly to the fabrication of the fuselage thereof, an object of the invention being to provide an airplane fuselage construction adapted to be utilized with various types of aircraft and embodying certain improvements and novel features of construction whereby substantial savings in the cost of manufacture are obtained while at the same time permitting maximum efficiency in operation, high strength-weight ratio and full latitude to effect the desired stream lining to reduce air resistance during flight.

The present application is a continuation of my co-pending application Serial No. 561,219, filed September 4, 1931.

A further object of the invention is to provide an improved airplane fuselage construction having a novel framework so designed as to provide suitable passenger and cargo space, and fabricated so as to take substantially all initial stresses and to carry all the load without any substantial stress or torque being transmitted through the shell or skin carried by the framework.

A further object of the invention is to provide an improved airplane fuselage having a supporting frame constructed to form a bulkhead amidship, which bulkhead provides a focal point for all forces and stresses to which the craft is subjected during operation. Moreover, the improved construction of the frame is such as to provide a reinforcing enclosure for a passenger or operator's compartment in advance of the bulkhead. In addition the construction of the frame is such as to provide a stronger and more efficient means for attachment of the wings of the craft, either in the monoplane or biplane type of airplane.

A further feature of the invention resides in the fact that the frame is constructed so as to provide a safety landing skid extending longitudinally between the wheels of the landing gear.

A further object of the invention is to provide an improved fuselage which combines any advantages of the monocoque and steel tube types of fuselage while eliminating many of the disadvantages thereof particularly the cost of fabrication. By virtue of the invention the framework of the fuselage may be formed of structural aluminum or an equivalent metal, and may be fabricated more cheaply and easily than present types of fuselages.

A further feature of the invention resides in the fact that the framework may be constructed to provide a substructure or sub-frame extending below the body or shell of the ship, such substructure providing a means for attachment of a wing, enabling the wing to be positioned a greater distance below the neutral axis of the body, hence producing in operation a greater ground pack, slower landing speed and quicker takeoff.

Other objects of this invention will appear in the following description and appended claims, reference being had to the accompanying drawings forming a part of this specification wherein like reference characters designate corresponding parts in the several views.

Fig. 1 is a side elevation, partly diagrammatic, illustrating one embodiment of the invention.

Fig. 2 is a perspective view of a fuselage construction embodying the invention, parts being removed for the purpose of clearness.

Fig. 3 is a plan view, partly diagrammatic, of the construction shown in Fig. 1.

Fig. 4 is a front elevation, partly diagrammatic, illustrating the fuselage.

Fig. 5 is a fragmentary detail view showing the connecting means for the shell members.

Fig. 6 is a fragmentary detail view showing the auxiliary landing skid.

Fig. 7 is a detail view of the rudder mounting with a portion thereof enlarged in section.

Fig. 8 is a plan view of the construction shown in Fig. 7.

Fig. 9 is a fragmentary perspective view of a modified form of skeleton frame for the fuselage.

Fig. 10 is a front elevation, partly diagrammatic, of the fuselage.

It is to be understood that the phraseology or terminology employed herein is for the purpose of description and not of limitation, and it is not intended to limit the invention claimed herein beyond the requirements of the prior art.

Referring to the drawings and more particularly Fig. 2, the fuselage of the airplane shown by way of example in the present instance comprises a main frame for supporting the engine, the empennage, the shell and other parts of the craft, this frame being preferably constructed of structural members formed of relatively light metal, such as aluminum alloy or other equivalent metal. Adjacent the passenger or operator's compartment B there is provided a frame A which in the present instance comprises a structural I-bar bent preferably into substantially oblong shape to provide upper and lower vertically spaced longitudinal sides 9 and 10 respectively, joined in rear of the compartment by a substantially vertical or upright side 11 and in front thereof by a vertical or upright side 12. For convenience in fabrication the frame portion A in the present instance is shown as formed from a single structural bar with the ends overlapped and riveted together through connecting plates 13 which in turn provide means for attaching a wing. This frame A, however, may be formed of several connected members, as desired, and it will also be understood that in the case of larger types of airplanes, especially of the multi-motor kind, a plurality of frame portions A, laterally spaced, may be utilized, and in such case each of such frames may, if desired, be constructed to support an engine.

The frame A is preferably reinforced in rear of the compartment B so as to provide a bulkhead into which the stresses and strains are transmitted. A vertical I-bar 14 bisects this frame and is riveted at opposite ends to the sides 9 and 10. Riveted at opposite sides of the member 14 and extending rearwardly in diverging relation are pairs of bars 15 and 16 which are riveted at their outer ends to the frame A. An I-bar 17 connects the portion 12 of frame A to the lower end of the pillar 14, extending longitudinally beneath the floor of the compartment. Extending laterally from the lower part of the pillar 14 are a pair of I-bars 18 and 19 which are secured to the member 14 by means of angle plates and are braced by means of bars 20 and 21. A pair of I-bars 22 and 23 are secured through the medium of angles plates to the lower part of the front portion 12 of the frame A, and these in like manner are braced by means of bars 24 and 25. A channel member 26 connects the member 22 to the member 18, and a similar channel 27 connects the member 23 with the member 19, these channel members together with the truss member 17 providing the supporting means for the floor of the compartment.

In the present instance the tail assembly or empennage is supported from the frame A by means of a cantilever beam or truss extending from the bulkhead axially and rearwardly through the tail. This truss in the present instance comprises two channel members 28 and 29 extending at opposite sides of the frame portion 11 and riveted thereto, and also riveted at their forward ends to opposite sides of the pillar 14. At their rear ends the channel members 28 and 29 are connected together by means of a vertical I-bar 30 which in turn supports the tail skid or wheel.

Within the compartment B a seat for the operator and passengers, depending upon the capacity of the craft, may be provided by means of transverse channel members 31 and 32 secured to the floor supports 17, 26, and 27, and connected together by means of end bars 33 and 34.

The present invention also contemplates the provision of novel and improved means for covering the frame of the craft so as to produce a shell of relatively inexpensive construction, easily installed and arranged to permit ready access to the interior of the airplane, such as for inspection purposes. Furthermore, the construction of the shell is such as to facilitate designing of the plane to produce the desired stream lining.

Mounted at intervals along the tail boom 28, 29, are a plurality of shell supporting rings or hoops 35 and 36, which may be formed of metal or other suitable material. The hoop 35 is braced in position by means of struts 35a secured to and projecting outwardly from the members 28 and 29. In like manner the hoop or ring 36 is supported in position by means of similar struts 36a. Additional hoop or ring members 37, 38, 39, and 40 are mounted at intervals along the fuselage and are provided for the purpose of supporting other portions of the shell. The ring or hoop 37 is braced by means of struts or spreader bars 37a. The hoops or rings 38 and 39 extend beneath the floor supporting structural members and are held in proper positions by means of the several frame bars 41 carried by the frame 9, these frame bars providing a supporting means for the wind shield. As will be seen in Fig. 2 the ring or hoop 40 at the forward end of the fuselage is braced in position by means of the frame members 22 and 23, the upper ends of the hoop being fastened to the vertical frame portion 12.

In the present instance the shell or so-called "skin" comprises a series of sheet metal panels, preferably formed of light aluminum alloy or similar material. These panels comprise hinged pairs, each pair being permanently stamped to provide the desired configuration so that when assembled the proper shape will be given to the shell of the craft, particularly for stream lining purposes. As illustrated in the present case, by way of example, a pair of similarly shaped panels 42 and 42a are supported on the hoop or ring 35; a pair of panels 43 and 43a are carried by the spaced hoops or rings 35 and 36; a pair of similar panels 44 are in like manner stamped so as to fit over the rings or hoops 36 and 37. Additional pairs of panels 46 and 47 are mounted on the hoops or rings 38, 39 and 40, all of these panels being stamped so as to conform to the predetermined shape or curvature of the various hoop or ring members. The several pairs of panels are preferably hinged together along the bottom of the shell, and this is preferably accomplished by forming adjacent edges of the respective panels with interlocking knuckle portions which are joined together by means of longitudinally extending pintle pins, thus producing a piano hinge and providing a very strong connection. Consequently, as shown in Fig. 2 the panels may be readily hinged together and mounted on the ring supports so as to permit the panels to be swung into or out of position as desired. As illustrated in Fig. 5 the upper portions of the panels may be releasably connected together as by means of turn buckles. In assembling the shell the panels 43 and 43a preferably overlap at their rear edges the forward edges of the adjacent panels 42 and 42a. The panels 43 and 43a may be provided with notched portions 51 within which are confined the members of a conventional turn buckle 52 secured to the panels 42 and 42a. By tightening the turn buckle these panels may be drawn firmly into position on the supporting hoop or ring 35. In like manner the remaining pairs of panels forming the shell may be connected together and clamped in positions on their ring or hoop supports. The longitudinal joint between the pairs of panel members at the upper part of the shell may be concealed by means of a finishing strip 53. As indicated in Fig. 1, a suitable fairing 54 may be provided for the purpose of covering the upper stretch 9 of the frame A.

The invention may be applied either to the monoplane or biplane type of craft, the latter being shown in the present instance for the purpose of illustration. Accordingly the upper wing sections 56 may be mounted on the upper portion 9 of the frame A through the medium of hinge connections 55, and the lower wing 57 mounted on the bottom 10 of the frame A through the medium of similar hinge connections 55. It will thus be seen from the foregoing that the lower wing extends on a plane below the body or shell of the craft, this being possible by extending the side 10 of the oblong frame below the major area of the craft to provide a substructure.

Thus, from the foregoing, it will be seen that the low wing is fastened to a sub-frame extending below the fuselage or body of the craft. This enables the wing to be positioned nearer the ground to produce a more efficient ground pack without, however, producing any ground interference with the fuselage. Consequently, a lower landing speed and a quicker take-off is possible. Moreover, this construction provides a more desirable gap chord ratio, providing a high positive stagger for visibility purposes and substantially equal loading of both wings in the case of a biplane. Also, the arrangement of the upper wing in connection with the upper part of the frame A places the bottom of the upper wing on a horizontal line with respect to the line of vision which gives the inexperienced flyer an immediate sense of balance when in the air.

The usual landing gear, the wheels thereof being indicated at 58, is carried by the sub-frame structure 10, and the latter is so arranged that it may be utilized to provide an auxiliary landing skid intermediate the wheels of the landing gear, as illustrated particularly in Figs. 1 and 4. In the present instance the landing skid comprises a curved structural T-bar 59, secured at its forward end to the frame member 10, the forward and upward curve of the bar 59 being continued into the forward curved portion of frame member 10. This skid member is rigidly braced by means of struts 61 secured to the frame 10, and its rear end is connected thereto by means of a structural bar 60. From the foregoing it will readily be seen that in case the landing gear fails or a nose-over occurs upon failure of the landing gear, the portions 10 and 59 will act as a skid thus minimizing the danger of damage. The sub-structure 10 and 59 extending below the body of the craft centrally thereof is covered by a suitable fairing, thus forming in appearance a single longitudinal fin which will function as a stabilizer during flight.

The empennage indicated in general at C, is carried by the rear ends of the truss or tail boom 28, 29. The usual tail wheel or shoe 63 is carried by a cantilever spring 62 which is attached to the strut 30 and to the bar 28 by means of a shackle 63a. In accordance with the present invention the stabilizer fin 64 and also the rudder 66 may be mounted so as to extend below the rear end of the fuselage. This construction lowers the center of pressure on the rudder and cuts down the torque through the fuselage affording a greater degree of lateral stability.

The rudder mounting comprises a vertical T-bar 65 fastened to a filler block 67 fastened between the ends of the truss members 28 and 29. Secured to the upper and lower ends of the bar 65 are brackets 68 having sockets within which are pinned the opposite ends of a tube 69. The rudder 66 is carried by a sleeve 70 which is mounted to rotate on the tube 69 through the medium of suitable bushings 71.

By extending the fin and rudder below the fuselage greater directional stability is afforded because the torque from the righting moment is reduced. It is well understood that during flight when a gust of wind strikes the plane from the side the fin area tends to cause the plane to nose into the wind. When the fin area is wholly above the fuselage a rolling tendency is induced by the gust of wind striking the fin. In accordance with the present invention, however, by extending a portion of the fin area below the fuselage, this rolling tendency is reduced to a considerable extent owing to arangement of the fin and rudder above and below the neutral axis, and therefore the torque is reduced to a minimum, giving additional directional stability. By placing a portion of the rudder below the fuselage the center of pressure is lowered so far that the torque action through the fuselage is almost negligible. This construction also equalizes the balance of the rudder along the rudder post and evenly distributes the strain on the hinge.

From the foregoing it will be seen that by virtue of the present invention an airplane, either of the monoplane or multiplane type having a single engine or a plurality of engines, may be constructed so as to embody any or all of a number of novel and advantageous features described herein. The framework of the fuselage, which sustains all stresses and strains, may be constructed of structural members of light aluminum alloy or equivalent metal, providing a high strength-weight ratio. This construction permits relatively cheap fabrication on a production basis with the elimination of considerable labor expense. It eliminates the slow and costly method of assembling and welding steel tubing, and eliminates the time and expense involved in present monocoque types of construction.

A combined nacelle and fuselage may be formed by fabricating a structural frame, or laterally spaced frames, preferably in the manner described so as to extend in a vertical plane or planes around the operator's or passenger compartment. A bulkhead may be formed at the rear of such compartment for strength, and a tail supporting member attached to this frame. Forming rings or hoops for the covering or shell are mounted at suitable points along the frame, and the shell, preferably formed from stamped aluminum sheets or blanks, is held in place at one side by piano hinge members and at another side by tension applied through turnbuckles at the joints. The engine mount may be fastened to, and firmly supported, by the front portion of the frame. This frame also provides an improved means for attaching and supporting a wing or wings and also the empennage or tail assembly.

It will be seen that the improved construction eliminates the costly fabrication of bulkheads, the building of initial stresses into the skin, and the inefficient and expensive process of covering with cotton and then doping and painting. Moreover, the invention permits greater protection to operators or passengers, provides a greater safety factor in landing by virtue of the auxiliary or emergency landing skid, permits slower landing speed, quicker take-off, improved stabilization in flight, maximum streamlining possibilities in designing the craft, and full visibility during operation.

Referring to the embodiment of the invention illustrated in Figs. 9 and 10 there is here shown a skeleton frame A' also preferably of relatively light metal, such as aluminum alloy, and also designed to embrace the space B' for the passenger compartment. This frame comprises spaced horizontal I-bars 80 and 81 extending longitudinally and centrally of the compartment B' and above the same. These bars extend rearwardly in converging relation and the rear ends 80a and 81a thereof, in rear of the passenger compartment, are bent downwardly in arcuate fashion to meet at a point 82 on the rearwardly extending cantilever beams 83 where they are riveted to the latter. The bars 80 and 81 extend forwardly in diverging relation and the forward ends are joined by a transverse tie bar 84. The frame at the lower side of the passenger compartment comprises an I-beam 85 extending centrally thereof, the rear end 85a of which being curved upwardly to contact the tail beam at point 82 where it is riveted to the latter.

The tail beam 83 has a forward extension 83a, the terminal end of which is riveted to a vertical I-bar 86 centrally thereof, the latter bisecting the frame A'. The upper end of the pillar 86 is riveted to a cross tie 87 of I-formation which joins the rear portions of the members 80 and 81. The lower end of the pillar 86 is riveted to the frame member 85 as indicated.

To the front terminal end of the beam 85 is riveted a transverse I-bar 88 extending at right angles thereto. Angular braces 89 connect the ends of this cross member to the beam 85. The forward terminal ends of the members 80 and 81 are joined to the center of the cross member 88 at 90a by angular I-bars 90 which together with member 84 form a triangular upright frame in advance of the passenger compartment. The outer ends of the front cross member 88 are braced and supported by means of angular brace members 91 riveted thereto and to the members 90.

The front upright framing may be utilized as an engine mounting which may be connected thereto at suitable points indicated, for example, at 92. As in the previous embodiment the tail assembly or empennage is supported from the frame A' by means of the cantilever beam or truss 83 extending from the bulkhead at 86 axially and rearwardly through the tail. The shell may be constructed substantially as previously described, comprising a series of preformed sheet metal panels as shown in Fig. 2 supported by rings or hoops. Moreover, an auxiliary landing skid 59 intermediate the wheels of the landing gear may also be provided as in the previous embodiment.

In the illustrated constructions, herein shown by way of example, it will be noted that the center of gravity lies at a point near or at the neutral axis and at the forward part of the compartment B or B'. The truss member 12 or members 90, upon which the engine may be mounted, is preferably in advance of the center of gravity, and the bulkhead formed by the members 11, 14—16 or by the corresponding members in the construction illustrated in Fig. 9, is in rear of the center of gravity. This bulkhead forms the focal point for substantially all forces and stresses to which any part of the plane is subjected. Substantially all stresses incident either to a level or a three-point landing are transmitted from the longitudinal trusses 9 and 10, or the trusses 80, 81 and 85, directly to the bulkhead where they are absorbed. These stresses are not transmitted through a frame, as heretofore, from one end of the fuselage to the rear end or empennage. Moreover, substantially all forces travelling from the empennage and substantially all tail stresses are transmitted through the cantilever beam to the bulkhead where they are absorbed. Thus, longitudinal forces travelling from either end are directed into the bulkhead where they are absorbed, and torsional stresses are in like manner consolidated at the bulkhead. Therefore, by virtue of the present invention there is provided a means for localizing forces and stresses at a point rear of the center of gravity and amidships, the manifest consequence, therefore, being that a much lighter fuselage may be utilized, eliminating excess weight in the framing, and greater stability is secured.

I claim:

1. In an airplane, a fuselage comprising a shell and a main supporting frame, said frame comprising a continuous structural member lying substantially in a vertical plane centrally of the shell and having two sides extending longitudinally at the top and bottom of the shell and joined by two substantially vertical front and rear sides, a rearwardly extending longitudinal frame member for supporting the empennage, bracing members connecting said last named frame member to the rear portion of the main frame to provide therewith a bulkhead, the front vertical side of said main frame forming means for supporting the engine.

2. In an airplane, a fuselage comprising a continuous structural metal frame including vertically spaced longitudinally extending portions and front and rear end portions forming a compartment therebetween, a frame member secured to said frame for supporting the empennage, and an enclosing shell carried by the frame, the lower of said longitudinally extending frame portions being disposed below the shell substantially centrally of the fuselage.

3. In an airplane, a fuselage comprising a structural metal frame including vertically spaced longitudinally extending members joined at their front and rear ends to form a compartment therebetween, a frame member secured to said frame for supporting the empennage, an enclosing shell carried by the frame, the lower of said longitudinally extending members being disposed below and spaced from the shell substantially centrally of the fuselage, and a landing skid carried by said last mentioned member.

4. In an airplane structure, a fuselage body forming an enclosing shell and having an operator's compartment, a main frame supporting said body, said frame having two sides extending longitudinally above and below said compartment and joined in front and rear of the compartment to substantially enclose the same, the lower of said two sides extending below and spaced from the body, and a landing skid carried thereby.

5. In an airplane structure, a fuselage body forming an enclosing shell having an operator's compartment, a main frame supporting said body, said frame having two sides extending longitudinally above and below said compartment and joined in front and rear of the compartment to substantially enclose the same, the lower of said two sides extending below and spaced from the body, and a wing carried thereby.

6. In an airplane, a fuselage comprising a structural frame extending substantially continuously around the operator's compartment, means carried by said frame at its front for supporting an engine, a shell embracing a substantial portion of said frame, hoop shaped members mounted on the frame for supporting said shell, said shell comprising pairs of shaped panels having adjacent edges thereof hinged at one side of the fuselage, and means for connecting together the opposite adjacent edges of said panels at another side of the fuselage.

7. In an airplane, a fuselage comprising a structural frame extending substantially continuously around the operator's compartment, means carried by the front portion of said frame for supporting an engine, a shell embracing a substantial portion of same frame, hoop shaped members mounted on the frame for supporting said shell, said shell comprising pairs of shaped panels having adjacent edges thereof hinged at one side of the fuselage, and releasable clamping devices for connecting together the opposite adjacent edges of said panels at another side of the fuselage.

8. In an airplane, a fuselage comprising a structural frame extending substantially continuously around the operator's compartment, a pair of landing wheels carried by said frame, the lower portion of said frame being disposed intermediate said wheels, and an auxiliary landing skid carried by said lower frame portion intermediate said wheels.

9. In an airplane, a body including an enclosing shell having a compartment therein, a frame supporting said shell and including a member extending below and spaced from the body intermediate its ends and designed to form a fin.

10. In an airplane, a body including an enclosing shell having a compartment therein, a frame supporting said shell and including a member extending below the body intermediate its ends, said member extending centrally of the body and forming a combined auxiliary skid and fin.

11. In an airplane, a fuselage comprising a structural frame extending around certain sides of an operator's compartment, landing wheels carried by said frame, the lower portion of said frame extending into the space between said wheels, and a combined auxiliary landing skid and fin carried by said lower frame portion.

12. In an airplane, a frame comprising a metallic truss structure embracing a passenger compartment, a portion of said structure being spaced from and extending beneath said compartment, an empennage connected with and extending rearwardly from said truss structure, and a combined landing skid and fin carried by said lower truss portion.

13. In an airplane, a fuselage including as a single structural unit amidships of the plane a yoke-like frame having upright portions in front and rear of a compartment and a truss joining the same and extending longitudinally of the compartment, an engine mounting carried by the front upright portion, and a rearwardly extending cantilever tail beam for transmitting tail stresses to the frame rearwardly of said front upright frame portion.

14. In an airplane, a fuselage including a forward upright frame structure providing an engine mounting, a tail including an empennage, an upright bulkhead spaced rearwardly of said frame structure and in advance of the tail, a longitudinal truss joining said frame structure and bulkhead, the latter being disposed in rear of the center of gravity of the plane whereby landing forces are transmitted by said truss to the bulkhead and independently of the tail, and a cantilever tail beam supported from said fuselage and effective to transmit tail stresses to the bulkhead independently of said forward frame structure.

15. In an airplane, a fuselage including as a single structural unit amidships of the plane a yoke-like frame having upright portions in front and rear of a compartment and a truss joining the same and extending longitudinally of the compartment, and a rearwardly extending cantilever tail beam for transmitting tail stresses to the frame rearwardly of said front upright frame portion.

16. In an airplane, a fuselage including a forward upright frame structure, a tail including an empennage, an upright bulkhead spaced rearwardly of said frame structure and in advance of the tail, a longitudinal truss joining said frame structure and bulkhead, the latter being disposed in rear of the center of gravity of the plane whereby landing forces are transmitted by said truss to the bulkhead and independently of the tail, and a cantilever tail beam supported from said fuselage and effective to transmit tail stresses to the bulkhead independently of said forward frame structure.

17. In an airplane, a fuselage including a continuous metal frame embracing at least three sides of a passenger compartment, said frame extending longitudinally and centrally of the compartment and terminating at the front thereof in an upright portion and at the rear thereof in a bulkhead located amidships, and a rearwardly extending tail beam attached to said bulkhead directly in rear of the compartment and extending axially through the tail.

18. In an airplane, a fuselage comprising a frame structure embracing a plurality of sides of a forward passenger compartment, an upright truss structure positioned rearwardly of said compartment and disposed behind the center of gravity of the plane and forming a bulkhead located amidships of the plane, a longitudinal cantilever truss joined to said bulkhead and extending through the tail, the construction being such that longitudinal stresses or forces in either direction are transmitted through said frame structure or longitudinal truss to said bulkhead and localized thereat.

19. In an airplane structure, a vertical truss arranged substantially in the vertical plane passing through the longitudinal axis of said airplane and providing the main frame for the airplane structure, said truss including a continuous member extending around the top, rear and the bottom of the nacelle.

WILLIAM B. FIRNER.